Nov. 13, 1945.         B. ATKINSON         2,388,815
CONFECTIONS
Filed Nov. 6, 1942
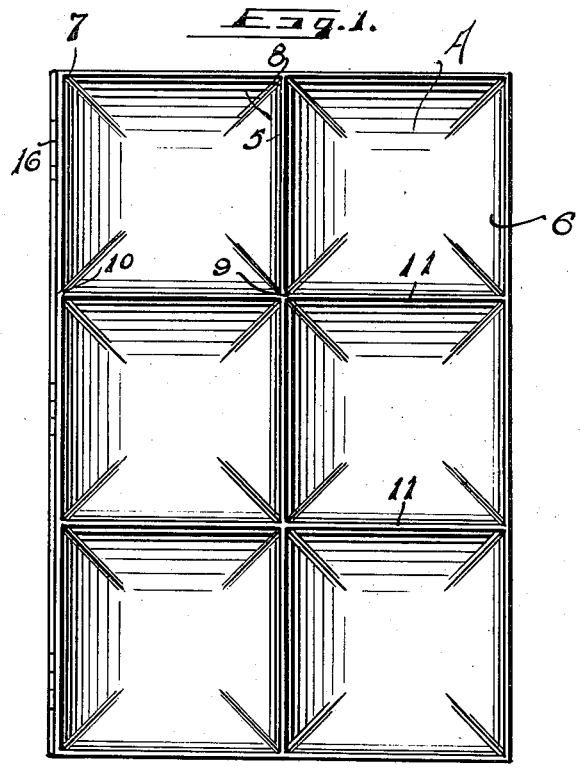
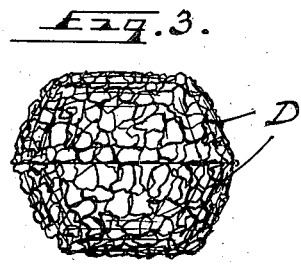
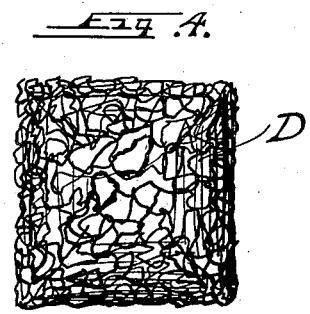
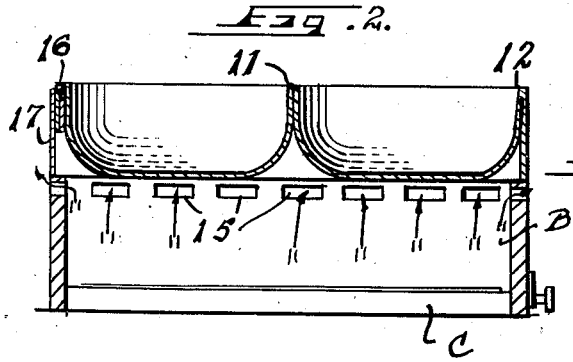
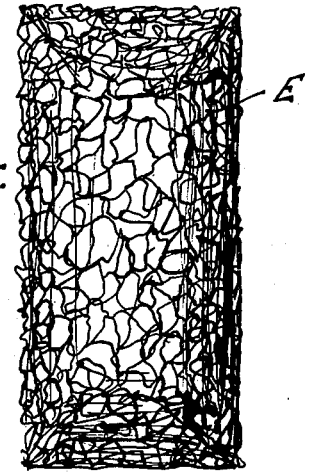
Inventor
Benjamin Atkinson
By R. M. Thomas
Attorney Patented Nov. 13, 1945

2,388,815

UNITED STATES PATENT OFFICE 2,388,815

CONFECTION

Benjamin Atkinson, Salt Lake City, Utah

Application November 6, 1942, Serial No. 464,816

1 Claim. (Cl. 107—16)

My invention relates to confections and more particularly to those confections made from popcorn coated with a candy binder and commonly called "popcorn balls."

A further object is to provide a new method of and apparatus for forming popcorn balls and the like which consists of the following details set out in the specification hereinafter and which provides a popcorn ball easily and economically formed without undue work or waste of time.

A still further object is to provide a popcorn ball made in a special mold in which the ball is formed as a half and two placed together in the dispensing package to be sold as a ball.

A still further object is to provide a mold for popcorn confections which mold will be made in a multiplicity of half forms and which will be easily filled and which will be kept warm by a special heater and when the balls are formed they may be dumped from the mold onto any suitable surface for cooling and hardening of the confection holding the popcorn in form.

Heretofore it has been the practice to form popcorn balls by hand which naturally requires a great deal of labor, time lost, expensive materials and naturally is very slow in process. The corn must be popped and then dipped or coated with the candy confection for adhering it integral and this confection so dipped must be kept hot all the time requiring expensive large kettles and continuous use of heating medium. With my invention this is entirely eliminated, and the confection is adhered to the corn and the corn formed in to half balls of half forms quickly and speedily forming twenty or thirty balls in the time required for forming three or four by hand.

These objects I accomplish with the device illustrated in the accompanying drawing in which similar numerals and letters of reference indicate like parts throughout the several views and as described in the specification forming a part of this application and pointed out in the appended claim.

In the drawing,

Figure 1 is a plan view of part of a mold showing a multiplicity of forms.

Figure 2 is a section on line 2—2 of Figure 1.

Figure 3 is a side elevation of a finished ball.

Figure 4 is a plan view of the ball.

Figure 5 is a plan view of an elongated popcorn confection sometimes termed on the market as a "Krispet." Many other forms may be made in my invention such as special holiday forms like hearts for Valentine Day, hatchets for Washington's Birthday, rabbits for Easter and the like so long as the perimeter of the mold comes to a right angled corner.

The main essential feature of this invention resides in the fact that the top surface of the multiple mold is made on a flat plane and all dividing partitions between individual molds is a thin partition thereby causing no obstruction to placing the corn in the molds.

My method of forming the balls consists of mixing a batch of corn with its candy coating and then pouring it into a large flat surface mold having depressions thereon. Spreading the corn over the mold area with a flat surface such as a board and pressing the corn down into the molds making a smooth top surface, with the mold kept hot all the time the process is being followed. The mold is hinged along one edge and when all forms are filled the mold is then tilted and the corn and confection released from the molds by turning the mold over on its hinge until the forms are upside down over a flat surface onto which the formed products rest. Withdrawing the mold and continuing the process indefinitely.

In the drawing I have shown the mold as A and it consists of a multiplicity of semi-molds formed square in plan view and with the corners curved at 5 to form the half mold form 6. Each corner is square at 7, 8, 9 and 10, and the form is made by impressing the forms in a single sheet of metal with dividing partitions 11 between each mold and all partitions and the perimeter 12 of the mold being on a common flat surface or plane. The mold A is supported on a rectangular frame B in the bottom of which a heater C is provided to keep the mold A heated. Ports or vent holes 15 permit the escape of gases from the frame B and hinges 16 hinge the mold to the frame side 17 of the frame B for tilting the mold A for emptying it. The finished half sections D are after cooling set together and packed together to form a whole, as shown in Figures 3 to 5 inclusive.

The elongated form shown as the finished product E Figure 5 is formed in a like manner but with the body elongated to make it of greater body. Any form desired and any shape may be made so long as they may be formed with right angled or angled corners which will make an all over pattern such as diamonds without departing from the spirit of the invention or the scope of the claim.

Having thus described my invention I desire to secure by Letters Patent and claim:

A mold for forming popcorn confections, comprising a casing having molds formed therein, all of which meet to form thin line edges at the top of the casing on a flat horizontal plane around the perimeter of each mold section so that there will be no flat surface to catch the confection when it is being placed therein other than the mold areas a support stand, adapted to receive a heater therein, said stand having one side vertically extended to the level of the horizontal plane of the mold casing; and hinges connecting the vertical side of the stand to one edge of the mold casing.

BENJAMIN ATKINSON.